US009916433B2

(12) United States Patent
Schwarz et al.

(10) Patent No.: US 9,916,433 B2
(45) Date of Patent: Mar. 13, 2018

(54) CONDITION AUTHENTICATION BASED UPON TEMPORAL-SPATIAL ANALYSIS OF VIBRATIONAL RESPONSIVITY

(71) Applicant: ContinUse Biometrics Ltd., Tel Aviv (IL)

(72) Inventors: Moshe Arie Ariel Schwarz, Bnei Brak (IL); Zeev Zalevsky, Rosh HaAyin (IL); Yevgeny Beiderman, Tel Aviv (IL); Javier Garcia, Valencia (ES); Amir Shemer, Petach Tikva (IL)

(73) Assignee: CONTINUSE BIOMETRICS LTD., Tel Aviv (IL)

( * ) Notice: Subject to any disclaimer, the term of this patent is extended or adjusted under 35 U.S.C. 154(b) by 135 days.

(21) Appl. No.: 15/040,211

(22) Filed: Feb. 10, 2016

(65) Prior Publication Data
US 2017/0228527 A1    Aug. 10, 2017

(51) Int. Cl.
*G06K 9/00* (2006.01)
*G06F 21/32* (2013.01)
*G06F 17/30* (2006.01)

(52) U.S. Cl.
CPC ........ *G06F 21/32* (2013.01); *G06F 17/30604* (2013.01); *G06K 9/00013* (2013.01); *G06K 9/00087* (2013.01)

(58) Field of Classification Search
CPC .............. G06F 21/32; G06F 17/30604; G06K 9/00087; G06K 9/00013
See application file for complete search history.

(56) References Cited

U.S. PATENT DOCUMENTS

| 7,088,455 | B1 | 8/2006 | Kirkpatrick et al. | |
|---|---|---|---|---|
| 2004/0233459 | A1 | 11/2004 | Booth | |
| 2007/0177772 | A1 | 8/2007 | Fujii et al. | |
| 2008/0159529 | A1 | 7/2008 | Aarts et al. | |
| 2010/0168585 | A1 | 7/2010 | Fujii et al. | |
| 2011/0026783 | A1* | 2/2011 | Fujii | A61B 5/117 382/124 |
| 2013/0329953 | A1 | 12/2013 | Schreier | |
| 2014/0148658 | A1* | 5/2014 | Zalevsky | A61B 5/4504 600/301 |
| 2014/0321734 | A1* | 10/2014 | Shirley | G06T 7/55 382/154 |
| 2015/0261299 | A1* | 9/2015 | Wajs | G06F 3/011 726/19 |
| 2015/0310251 | A1* | 10/2015 | Wyrwas | G06F 21/32 348/77 |
| 2017/0070347 | A1* | 3/2017 | Lutian | H04L 9/3231 |

* cited by examiner

*Primary Examiner* — Yon Couso
(74) *Attorney, Agent, or Firm* — Browdy and Neimark, P.L.L.C.

(57) ABSTRACT

The present invention relates to a method and system for condition authentication based upon temporal-spatial analysis of vibrational responsivity. In particular, the present invention provides temporal tracking of reflected secondary speckle patterns generated when illuminating an object with a source of at least partially coherent beam and while applying a stimulated field at different temporal stimulating frequencies.

26 Claims, 16 Drawing Sheets

CONDITION AUTHENTICATION BASED UPON TEMPORAL-SPATIAL ANALYSIS OF VIBRATIONAL RESPONSIVITY

TECHNOLOGICAL FIELD

The present invention is in the field of condition authentication or identification of a scattering object by using vibrational responsivity originated from the object.

BACKGROUND

Personal authentication systems using biological information, such as fingerprints, have recently been commercially available. The biological information utilizes, for example, a fingerprint, a palm print, a finger shape, a palm shape, voice, a retina, an iris, a face image, a dynamic signature, blood-vessel arrangements, or keystroke. The biometric information is superior in reliability to a password. Of biometric information, a fingerprint is used frequently.

In a personal authentication system using a fingerprint, a fingerprint is to be checked against all sample fingerprints by means of round-robin matching. For instance, the authentication system employs a matching method (matching technique) of so-called one-fingerprint-against-multiple-registered-fingerprints type (hereinafter simply called a "1-N fingerprint matching method"). Round-robin matching is a technique of checking a fingerprint against all the registered fingerprint data for matching purpose, in sequence from the top. If fingerprint data pertaining to a person of interest are coincidentally located at the head of the sequence, it is expected that matching processing can be terminated immediately without involvement of matching operation using a fingerprint pattern.

With regard to personal authentication using a fingerprint, various systems have so far been developed which, instead of the old-established method involving visual inspection, a laser, etc. is used and a pattern is inputted into a computer as an image and analyzed. A large number of techniques for a sensor section for detecting a fingerprint have been proposed; for example, an optical method in which a fingerprint pattern is directly captured into an image sensor by combining differences in scattering angle between peak and valley with total reflection conditions, and a method in which a pattern is extracted by utilizing a semiconductor sensor that detects differences in charge distribution on a contact face have been put into practice. Furthermore, a method in which personal authentication is carried out by extracting a vein pattern of a finger-tip or a palm of a hand by means of near-infrared light has been proposed.

GENERAL DESCRIPTION

The present invention relates to a method and system for condition authentication based upon temporal-spatial analysis of vibrational responsivity. Here, "object" may be a single element or subject, or a group of elements or subjects.

There is provided an object authentication method comprising the following steps: applying a stimulation field of a periodically changing stimulation frequency to an object; applying unfocused imaging to the object being stimulated, the unfocused imaging comprising illuminating the object by at least partially coherent light, collecting a plurality of sequential secondary speckle patterns, each originated from at least a portion of the object being stimulated, and generating image data indicative thereof, the image data comprising a sequence of the speckle patterns for each of the stimulation frequencies; and processing the image data, the processing comprising: segmenting each of the speckle patterns into a two-dimensional matrix of spatial regions; comparing the sequential speckle patterns to determine a spatial-temporal change of a correlation peak for each of the regions; determining the change in the correlation peak position in time in the two-dimensional matrix associated with two dimensional spatial locations along the inspected object image; determining a temporal frequency signature uniquely characterizing the at least portion of the object by calculating a temporal frequency profile of the two-dimensional correlation peak position per the stimulation frequency, thereby enabling authentication of the object. In some embodiments, the method comprises selecting a coherence length for the coherent illumination to provide a desired ratio between the size of the illumination spot and size of the speckles in the captured set of patterns. In this way, the spatial coherence is appropriately selected in order to allow illuminating a large area and yet having large speckles, inversely proportional to the coherence length of the illumination source (being shorter than the diameter of the illumination spot).

Therefore, the present invention relates to temporal tracking of reflected secondary speckle patterns generated when illuminating an object with a source of at least partially coherent beam and while applying a stimulated field (e.g. sinusoidal pressure stimulation) at different temporal stimulating frequencies via a support surface being for example a controlled vibration surface (CVS).

In some embodiments, the object comprises a body's part of at least one individual people. The body's part may be a passive soft tissue such as an individual's finger, or fingertip.

Alternatively, the method comprises applying stimulation to a body's part of a group of people. Each region of the two-dimensional matrix corresponds to the spatial signature authenticating an individual person.

In some embodiments, the periodic stimulation comprises applying sinusoidal pressure stimulation via the support surface contacting the object.

In some embodiments, the method comprises determining the temporal frequency range of the stimulation field variation. Indeed, the technique of the present invention determines the optimal temporal frequency range of the support surface contacting the object.

In some embodiments, the imaging step comprises collecting different portions of each secondary speckle patterns of the plurality of the secondary speckle patterns to reconstruct the full secondary speckle pattern of the object.

In some embodiments, the method comprises applying the stimulation field to an object being under dry and wet conditions and comparing the temporal frequency signature under the different conditions to provide a real-time scenario invariant (i.e. that remains unchanged when repeated under the same conditions) identification.

In some embodiments, the method comprises calculating a temporal frequency profile of a plurality of two-dimensional correlation peak positions per the stimulation frequency defining a spatial relationship of temporal frequency signatures for a plurality of two-dimensional spatial regions.

In some embodiments, the object comprises at least one rigid surface being a self-excited vibration surface. Such rigid surface may be a part of any mechanical systems including rotating machinery, machining tools, industrial turbomachinery, aircraft gas turbine engines etc.

In some embodiments, the stimulation field of the periodically changing stimulation frequency comprises a self-excited vibration field of the object. By applying the temporal-spatial analysis of vibrational responsivity as described above, the authentication of the object enables to determine a proper mode of functionality of the rigid surface as well as energetic consumption/tuning.

There is also provided a system comprising an object support surface configured for vibration in response to a stimulation field of a periodically changing stimulation frequency; an imaging device for performing defocused imaging of at least a portion of the object while on the support surface to thereby collect a plurality of sequential speckle patterns originated from at least a portion of the object while on the support being stimulated with the periodically changing stimulation frequency, and generating image data; and a processing unit adapted for processing the image data using stimulation field data, the processing unit being configured and operable to segment each speckle pattern into a two-dimensional matrix of spatial regions; compare the sequential speckle patterns to determine a spatial-temporal change of the correlation peak for each region of the two-dimensional matrix; determine the change in the correlation peak position in the two-dimensional matrix in time; and determine a temporal frequency signature uniquely characterizing the at least portion of the object by calculating the temporal frequency profile of the two dimensional correlation peak position per stimulation frequency, the temporal frequency signature being thereby enabled for use in determination of authentication of the object.

In some embodiments, the processing unit controls at least one stimulation field parameter applied to the support surface.

In some embodiments, the system comprises a source of a beam of at least partially coherent light. The source may include a highly coherent or partially coherent light emitting element.

In some embodiments, the system comprises a beam expander configured for expanding the spot of the beam on the object.

In some embodiments, the imaging device collects different portions of the plurality of the secondary speckle patterns reflected at a surface of the stimulated object.

In some embodiments, the support surface comprises a loud speaker controlled by the processing unit.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIGS. 4b-4d represent the temporal frequency signature of an index, middle and ring fingerprints respectively obtained by using the technique of the present invention for a person different from the person tested in FIG. 4a.

DETAILED DESCRIPTION OF EMBODIMENTS

The present invention relates authentication of an object using speckle patterns. Although the following examples are related to experiments aimed at determining fingerprint identification, it should be understood that the novel technique of the present invention should be used for any authentication of biometric information of a person, such as a fingerprint, facial image, voiceprint, retina pattern, iris pattern or the like. The imaging method may be used for imaging the object while moving. The movement may be associated with a vibration, e.g. of a living body's part. The vibration may correspond to a speech, a sequence of heart beats, a heart beat resolved to a heart beat's structure, as well as vibration of a cloth on a living body. The living body's part may be at least one of a hand joint, a chest, a throat, a temporal fossa, a stomach, a throat, a cheekbone, a head, a palm and a finger.

It should be noted that the size of the generated speckle can be estimated according to the following relation:

$$\delta x \approx \frac{\lambda Z}{\min\{D, L\}}$$

where $\lambda$ is the wavelength of the illuminating source, Z is the distance between the back reflecting object surface and the plane at which the specific speckle are generated. D is the diameter of the illumination spot and L is the coherence length of the partially coherent illumination source.

Figure 1A:
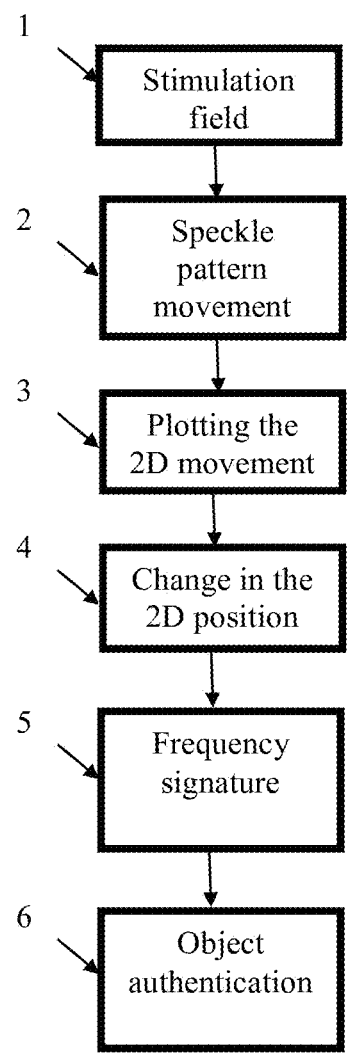
FIG. 1a schematically represents a flow chart illustrating different steps of the technique of the present invention.
Figure 1B:
FIG. 1b schematically represents a segmentation of the image data into a two-dimensional matrix of regions within a fingerprint image.

Referring to FIG. 1a, there is schematically illustrated an object authentication method comprising the following steps: (1) applying a stimulation field of a periodically changing stimulation frequency to an object; (2) applying unfocused imaging to the object being stimulated, the unfocused imaging comprising illuminating the object by at least partially coherent light, collecting a plurality of sequential secondary speckle patterns, each originated from at least a portion of the object being stimulated, and generating image data indicative thereof, the image data comprising a sequence of the speckle patterns for each of the stimulation frequencies; and processing the image data, the processing comprising: (3) segmenting each of the speckle patterns into a two-dimensional matrix of spatial regions; comparing the sequential speckle patterns to determine a spatial-temporal change of a correlation peak for each of the regions; (4) determining the change in the correlation peak position in the two-dimensional matrix in time associated with two dimensional spatial locations along the inspected object image; (5) determining a temporal frequency signature uniquely characterizing the at least portion of the object by calculating a temporal frequency profile of the two-dimensional correlation peak position per the stimulation frequency, thereby enabling authentication of the object in step (6). According to the invention, in other words, the object thus is subjected to a stimulation field of a periodically changing stimulation frequency (frequency sweeping) and the so-stimulated object undergoes unfocused imaging using illumination by at least partially coherent light. It should be understood that using an unfocused imaging refers to using an imaging system being focused on a plane displaced from the object. Such imaging technique is described for example in the U.S. Pat. No. 8,638,991 of the same inventors of the present invention incorporated herein by reference. The image data, in the form of a plurality of sequentially acquired speckle patterns originated at the stimulated object each corresponding to a different stimulation frequency, is collected, and analyzed to determine a change in a two dimensional position of a correlation peak between the sequential frames in the time domain. To this end, as illustrated in FIG. 1b, the processing includes segmenting the image data into a two-dimensional matrix of regions 100 within the object's image, each characterized by its dedicated parameter(s) of the correlation peak (e.g. position of the peak). As a result, the object's signature is obtained in the form of the correlation peak (intensity) as a two-dimensional position function per the stimulation frequency. This signature can then be verified using reference data for the authentication purposes. The novel technique of the present invention enables detecting personal identification with low rate of false alarms. The rate of false alarms is decreased by creating a segmented/sub-object data.

Figure 2A:
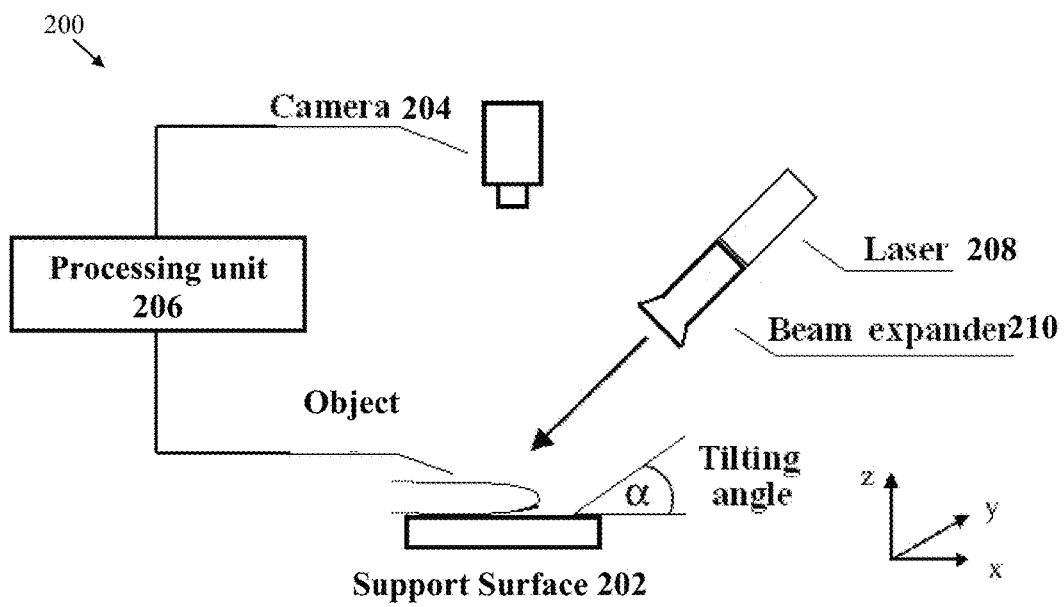
FIG. 2a schematically represents a possible configuration of the system of the present invention according to some embodiments.
Figure 2B:
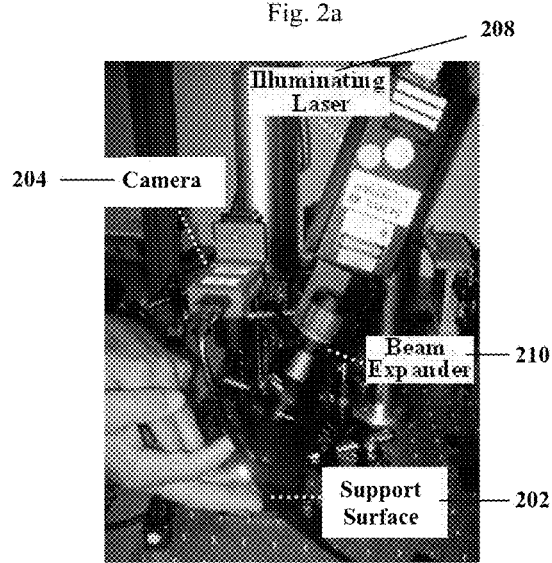
FIG. 2b is a picture of the same.

Reference is made to FIGS. 2a-2b illustrating a possible set up of the system of the present invention. The system 200 comprises an object support surface 202 configured for vibration in response to a stimulation field of a periodically changing stimulation frequency; an imaging device referred as camera 204 for performing defocused imaging of at least a portion of the object while on the support surface 202 to thereby collect a plurality of sequential speckle patterns originated from at least a portion of the object while on the support 202 being stimulated with the periodically changing stimulation frequency, and generating image data; and a processing unit 206 adapted for processing the image data using stimulation field data, the processing unit 206 being configured and operable to segment each speckle pattern into a two-dimensional matrix of spatial regions; compare the sequential speckle patterns to determine a spatial-temporal change of the correlation peak for each region of the two-dimensional matrix; determine the change in the correlation peak position in time in the two-dimensional matrix; and determine a temporal frequency signature uniquely characterizing the at least portion of the object by calculating a temporal frequency profile of the two dimensional correlation peak position per stimulation frequency, the temporal frequency signature being thereby enabled for use in determination of authentication of the object. It should be noted that all required processing operations (such as processing captured images, performing corresponding calculation operations, segmenting the speckle pattern into a two-dimensional matrix of spatial regions, comparing the sequential speckle patterns, determining a spatial-temporal change of the correlation peak for each region of the two-dimensional matrix, determining the change in the correlation peak position in time in the two-dimensional matrix, calculating a temporal frequency profile of the two dimensional correlation peak position per stimulation frequency, determining the frequency signature . . . ) may be performed by means of a processing unit 206, such as a DSP, microcontroller, FPGA, ASIC, etc., or any other conventional and/or dedicated computing unit/system. The term "processing unit" should be expansively construed to cover any kind of electronic device with data processing capabilities, including, by way of non-limiting example, personal computers, servers, computing systems, communication devices, processors (e.g. digital signal processor (DSP), microcontrollers, field programmable gate array (FPGA), application specific integrated circuit (ASIC), etc.) and other electronic computing devices. The processor unit 206 may comprise a general-purpose computer processor, which is programmed in software to carry out the functions described hereinbelow. Although processing unit 206 is shown in FIG. 2a, by way of example, as a separate unit from imaging device 204, some or all of the processing functions of processing unit 206 may be performed by suitable dedicated circuitry within the housing of the imaging device or otherwise associated with the imaging device 204. Unless specifically stated otherwise, as apparent from the following discussions, it is appreciated that throughout the specification discussions utilizing terms such as "processing", "computing", "calculating", "determining", "comparing", "segmenting" or the like, refer to the action and/or processes of a computer that manipulate and/or transform data into other data, said data represented as physical, e.g. such as electronic, quantities. Also, operations in accordance with the teachings herein may be performed by a computer specially constructed for the desired purposes or by a general purpose computer specially configured for the desired purpose by a computer program stored in a computer readable storage medium. The processor unit 206 includes inter alia a signal generator, and at least one utility part (suitable software and/or hardware) for processing the image data using stimulation field data. The utility is preprogrammed to segment each speckle pattern into a two-dimensional matrix of spatial regions, compare the sequential speckle patterns to determine a spatial-temporal change of the correlation peak for each region of the two-dimensional matrix, determine the change in the correlation peak position in time in the two-dimensional matrix and determine a temporal frequency signature uniquely characterizing the at least portion of the object by calculating a temporal frequency profile of the two dimensional correlation peak position per stimulation frequency. The software may be downloaded to processing unit 206 in electronic form, over a network, for example, or it may alternatively be provided on tangible media, such as optical, magnetic, or electronic memory media. Alternatively or additionally, some or all of the functions of the processing unit 206 may be implemented in dedicated hardware, such as a custom or semi-custom integrated circuit or a programmable digital signal processor (DSP).

In some embodiments, the system comprises a source of a beam of at least partially coherent light 208 referred in the figure as an illumining laser. Optionally the illumining laser 208 is associated with a beam expander 210 in order to get a large spot on the object. In this way, the coherence length for the coherent illumination is appropriately selected to provide a desired ratio between the size of the illumination spot and size of the speckles in the captured set of patterns.

In the specific and non-limiting set-up used by the inventors of the present invention, the imaging device 204 was a camera of a model PixeLink PL-D721MU having an exposure time of 0.5 msec, a frame rate of 500, the number of frames acquired was about 5000, a scan time of about 10 sec, a signal gain of 0 dB; a Gamma non-linearity of: 2.2. The support surface 202 was a speaker of a model OSC LS13C050, 2¼" Diameter, 50 ohm 0.5 Watt generating a sinusoidal wave at a frequency range of about 70-210 Hz and a voltage (Pk2Pk) of about 1.1 V. The source of a beam of at least partially coherent light 208 was a laser diode of a model Photop Suwtech Laser DPGL-2100F, having a wavelength of 532 nm max 100 mW with driver of a model Photop LDC-2500S having a driver current of 0.65 A, the beam expander used was of a model Thorlabs GBE05-A. The object was placed on the support surface 202. The measured power of the laser 208 on the object was 10-12 mw. The processing unit 206 was connected to the imaging device 204 to process the image data and to the support surface 202 to control the stimulation field. In this example, the stimulation field is controlled by a signal generator such as Tektronix AFG1022 associated with the processing unit 206. The signal generator may also be integrated with the processing unit 206. The images of the secondary speckle pattern reflected from the object were captured at the rate of 400-600 fps. The processing unit 206 first extracts the speckle pattern in each frame and then calculates the change in the 2-D position of the correlation peak versus time due to the vibrations generated at the support surface 202. The technique includes imaging of a coherent speckle pattern formed by an object or subject or, generally, a surface of interest. The pattern can be formed by illumination of the still or moving surface of interest by at least partially coherent light of a laser or another light source. Preferably, the surface movement includes a tilt component illustrated as a tilting angle α. The surface movement can be for example of vibration type. The vibration can be caused by a sound or vibration itself can produce a sound, thus making the motion of the surface of interest associated with the sound. In this specific and non-limiting example, the temporal movements of the object are produced due to acoustic vibrations of the support surface 202. Due to those vibrations the object is also vibrated. The described configuration includes observation of the secondary speckle pattern that is created by illuminating the object. In order to monitor the object vibration, the correlation of each of the sequential images is measured. By analyzing the temporal changes in the correlation peak position, relative movement of the stimulated object was extracted.

Imaging is performed by imaging device 204 at two instances: when the diffusive object is at a position and orientation DO1 and when the diffusive object is at a position and orientation DO2, DO1 and DO2 defining a certain tilting angle α. The imaging device 204 includes an imaging lens L and a pixel detector array PDA. The imaging device 204 is configured for focusing on a forward displaced plane IF. At both instances, the speckle pattern is formed as a reflection of at least partially coherent light beam LB (e.g. laser beam). With regards to speckle patterns the following should be noted. Speckle patterns are self interfered random patterns having relatively random amplitude and phase distributions. So-called "primary speckle patterns" can be generated by passage of illuminating light through a diffuser or a ground glass. So-called "secondary speckle patterns" can be generated by reflection of illuminating light from the diffuse surface of an object. The relative shift 13 of the speckle pattern is proportional to the change in the spatial position of the speckle pattern due to the object temporal movement:

$$\beta = \frac{4\pi \tan\alpha}{\lambda} \approx \frac{4\pi\alpha}{\lambda}$$

where α is the time varying tilting angle of the illuminated surface as shown in FIG. 2a, λ is the illumination wavelength.

The temporal movement of the object is proportional to the change in the speckle pattern that is caused by the stimulation field.

In order to detect a personal authentication, the frequency response of the stimulated object was calculated at the excitation frequencies (main peak) when excited due to the applied stimulation field. The frequency response (raw data) is expressed as:

$$X(k) = \sum_{j=1}^{N} x(j)e^{-2\pi ijk/N}$$

where x(j) is a temporal vector of the change in the position of the correlation peak vs. time, N is the number of frames that were captured during each sample.

Figure 3A:
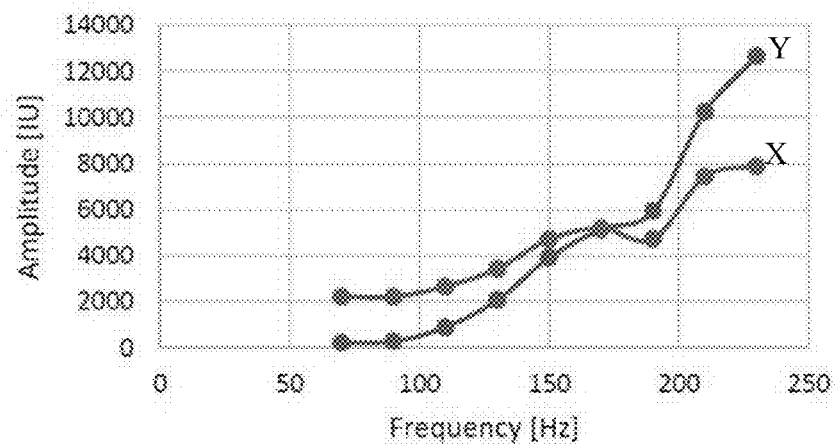
FIGS. 3a-3c represent the temporal frequency signature of a fingerprint obtained by using the technique of the present invention for three different individual persons.
Figure 3B:
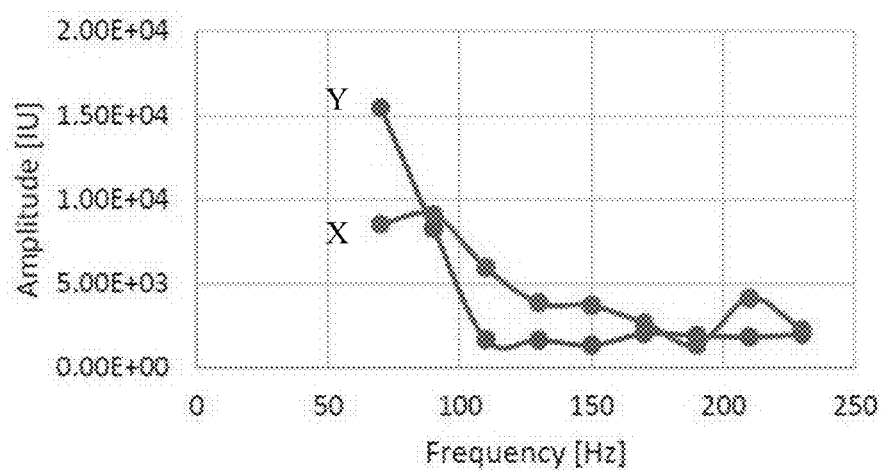
Figure 3C:
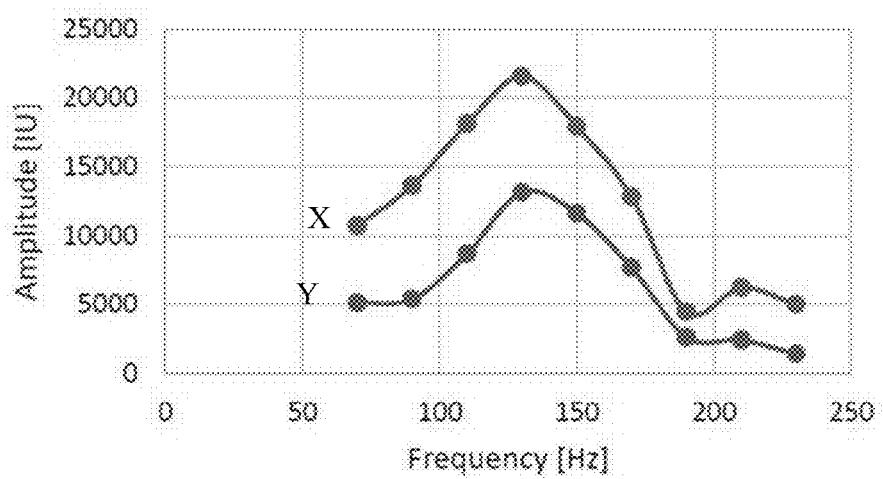

The following experiments illustrated in FIGS. 3-6 were performed by using the set up of the system described above with reference to FIG. 2a Reference is made to FIGS. 3a-3c illustrating the temporal frequency signature of a fingerprint for three different individual persons. In this experiment the full fingerprint was measured for three different persons. Three fingerprints from each person were tested. The results show that each person has a unique temporal frequency signature.

Figure 4A:
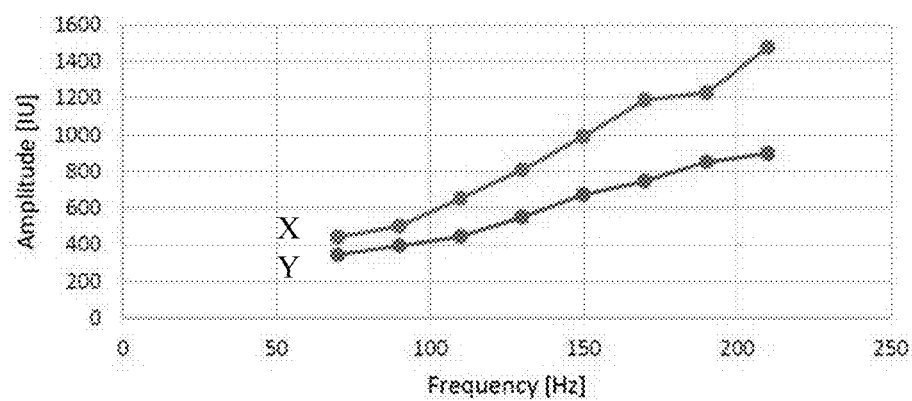
FIG. 4a represents the temporal frequency signature of an index fingerprint obtained by using the technique of the present invention for a specific person.
Figure 4B:
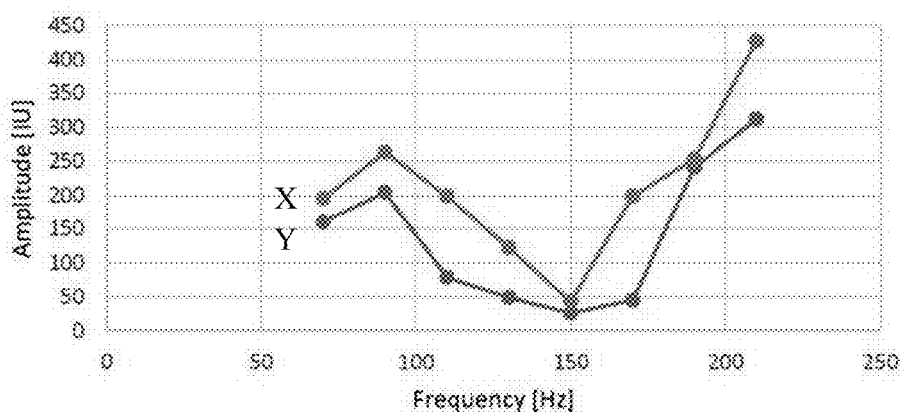
Figure 4C:
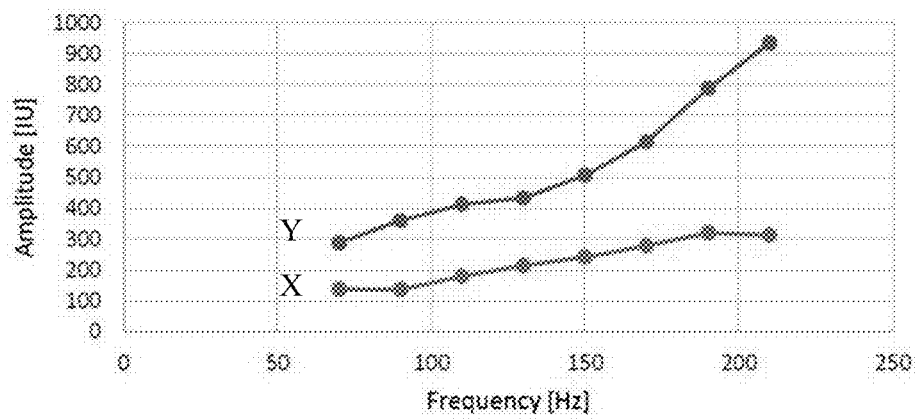
Figure 4D:
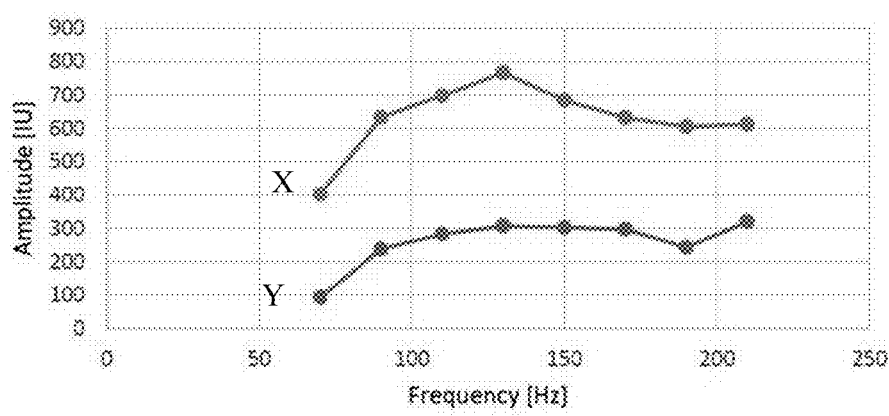
Figure 4E:
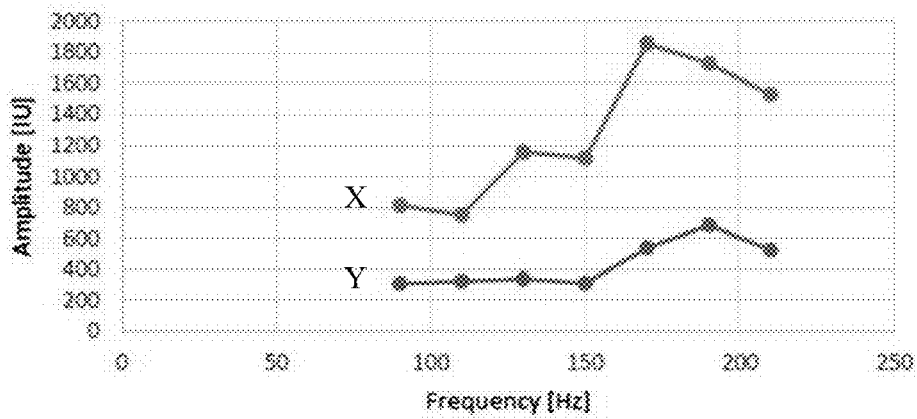
FIGS. 4e-4f represent the temporal frequency signature of an index, and ring fingerprints respectively obtained by using the technique of the present invention for a person different from the persons tested in FIG. 4a and FIGS. 4b-4d.
Figure 4F:
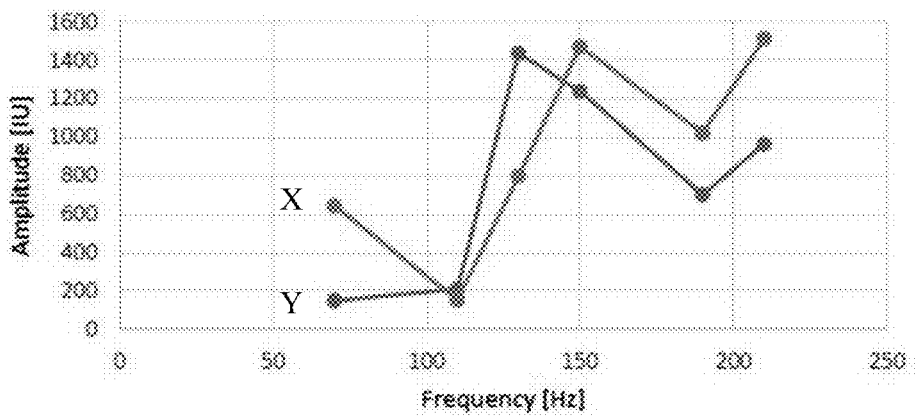
Figure 4G:
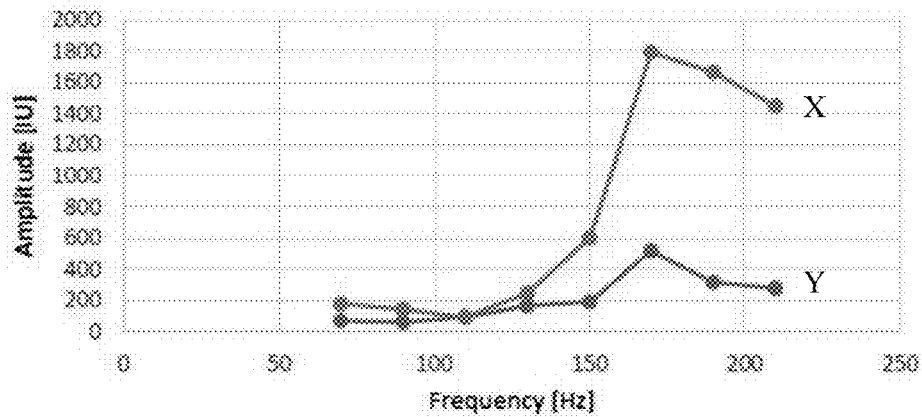
FIGS. 4g-4i represent the temporal frequency signature of an index, middle and ring fingerprints respectively obtained by using the technique of the present invention for a person different from the persons tested in FIGS. 4a-4f.
Figure 4H:
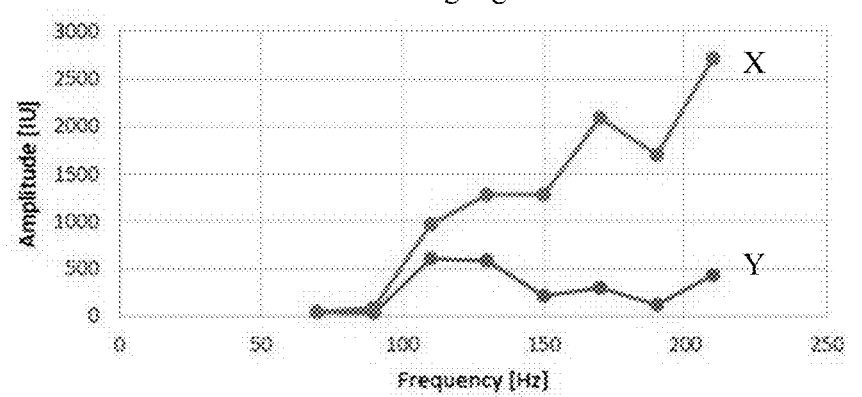
Figure 4I:
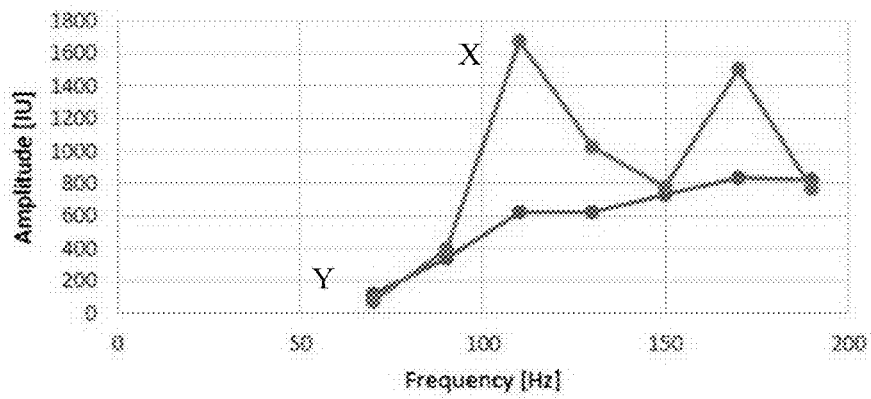

Reference is made to FIGS. 4a-4i illustrating different temporal frequency signatures obtained for segmented image data of different persons for different fingers. In this experiment a segmented fingerprint was measured for five persons. In some embodiments, the method comprises calculating a temporal frequency profile of a plurality of two-dimensional correlation peak positions per the stimulation frequency defining a spatial relationship of temporal frequency signatures for a plurality of two-dimensional spatial regions. To this end, each image data area was divided into a two-dimensional matrix having four two-dimensional spatial regions (sub-area) and was analyzed separately. The analysis comprises for example that the movement profile of the correlation peak in spatial region X (not represented) is the largest at temporal excitation frequencies a and b while in region Y (not represented) the movement profile of the correlation peak is the largest at temporal frequencies of b and a respectively. Three fingerprints from each person were tested (index, middle, ring). For stability test, the measurement was repeated for each finger three times (total of 180 segmented fingerprints samples). The results show that each person and also each finger of a person have a unique temporal frequency signature response. More specifically, FIG. 4a represents the temporal frequency signature of an index fingerprint for a person #1; FIGS. 4b-4d represent the temporal frequency signature of an index, middle and ring fingerprints for a person #2; FIGS. 4e-4f represent the temporal frequency signature of an index, and ring fingerprints respectively for a person #3; FIGS. 4g-4i represent the temporal frequency signature of an index, middle and ring fingerprints respectively for a person #4. It is clearly shown that each frequency response of different persons and finger is unique.

Figure 5A:
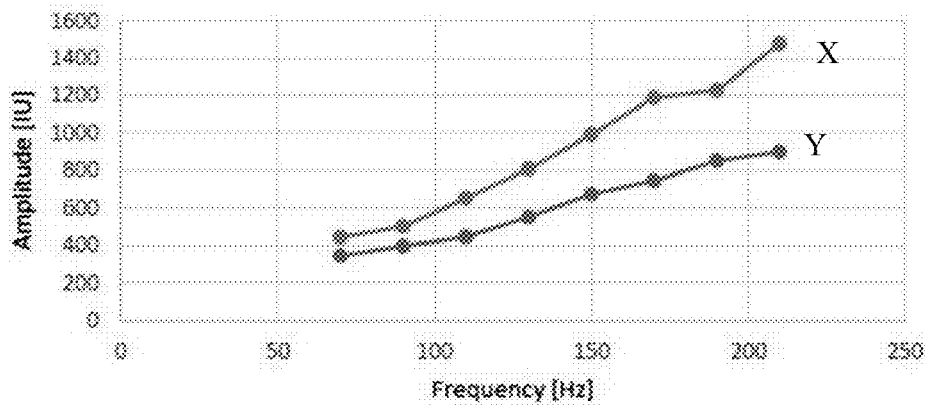
FIGS. 5a-5b illustrate the stability of the technique of the present invention by representing the temporal frequency signature of an index fingerprint of one person twice.
Figure 5B:
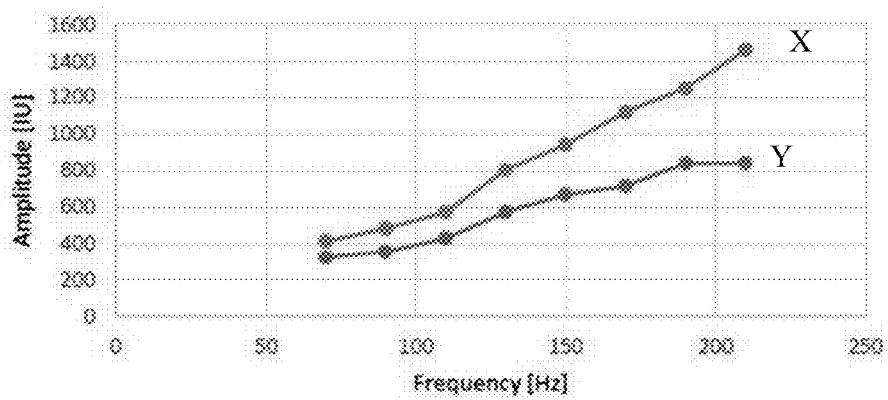
Figure 5C:
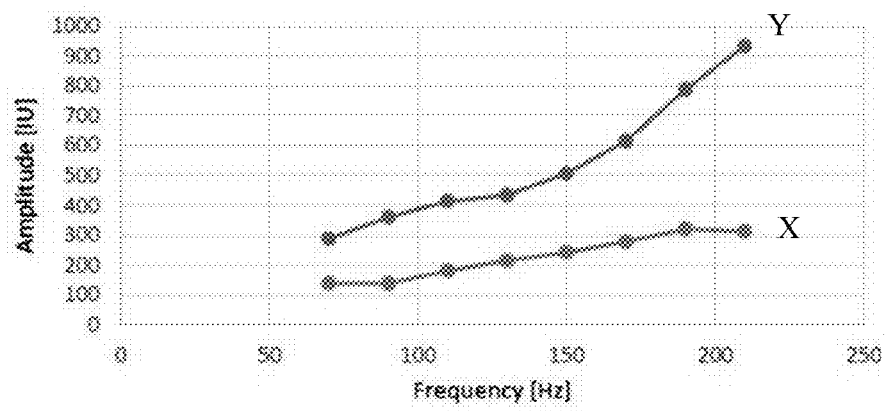
FIGS. 5c-5e illustrate the stability of the technique of the present invention by representing the temporal frequency signature of an index fingerprint of a person different from the person tested in FIGS. 5a-5b three different times.
Figure 5D:
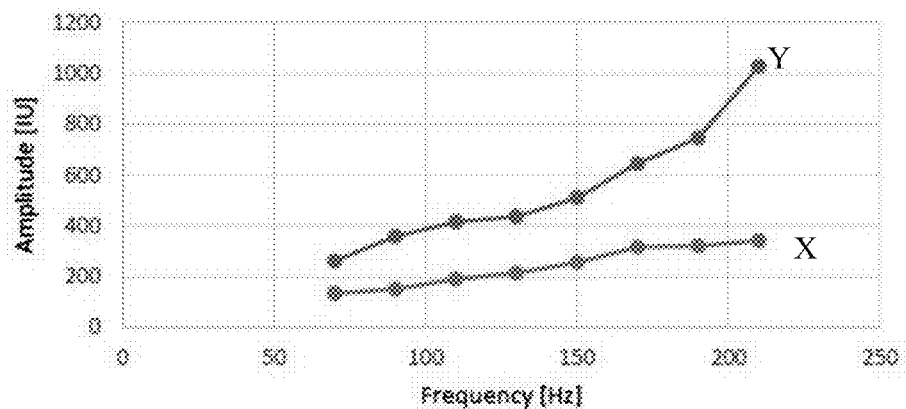
Figure 5E:
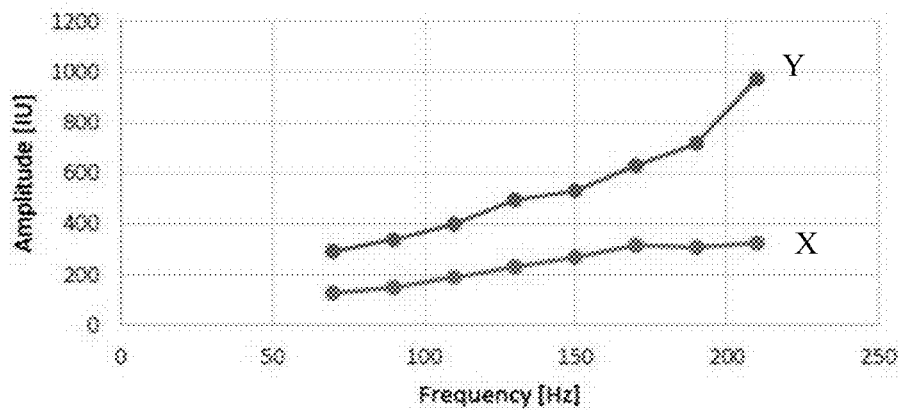
Figure 5F:
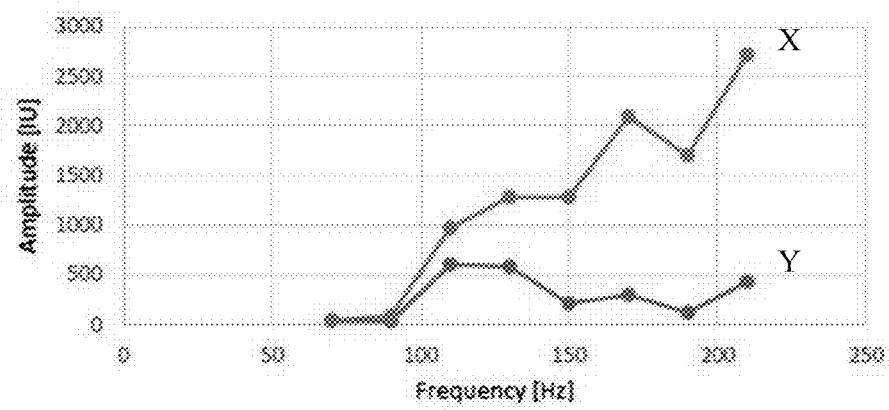
FIGS. 5f-5g illustrate the stability of the technique of the present invention by representing the temporal frequency signature of a middle fingerprint for a person different from the person tested in FIGS. 5a-5e twice.
Figure 5G:
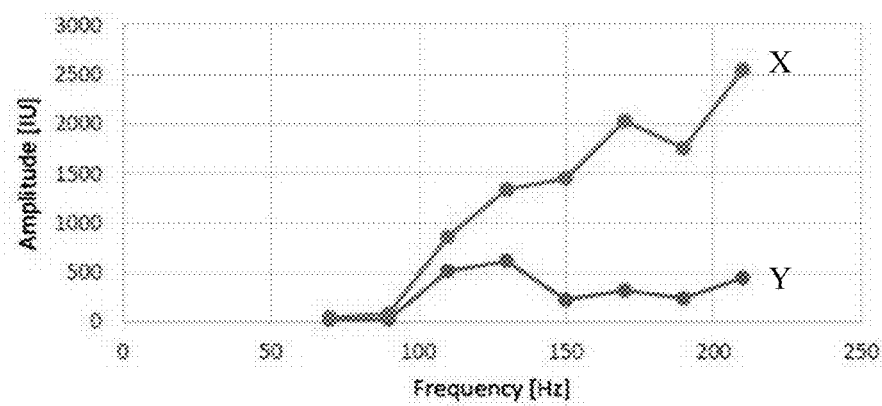

Reference is made to FIGS. 5a-5g showing stability test results demonstrating that the frequency response of each fingerprint is repetitive and fixed. FIGS. 5a-5b illustrate the stability of the technique of the present invention by representing the temporal frequency signature of an index fingerprint of person #1 twice respectively. FIGS. 5c-5e illustrate the stability results by representing the temporal frequency signature of an index fingerprint of person #2 three different times respectively. FIGS. 5f-5g illustrate the stability results by representing the temporal frequency signature of a middle fingerprint for a person #2 twice respectively. It can be clearly seen from the experiments that a similar temporal frequency signature is obtained when the fingerprint record is repeated.

Figure 6A:
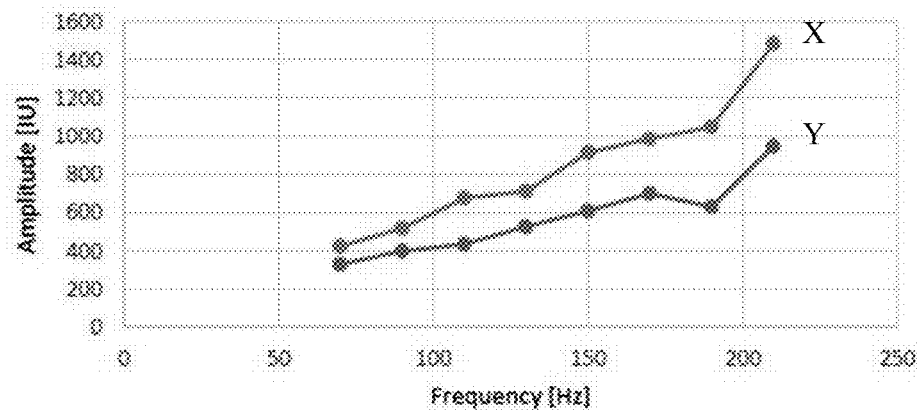
FIGS. 6a-6f represent the temporal frequency signature of middle and index fingerprints under dry and wet conditions respectively of different persons.
Figure 6B:
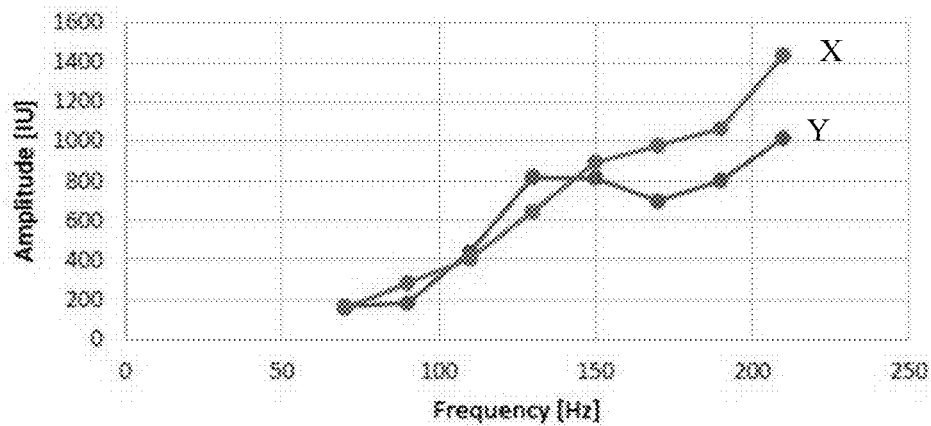
Figure 6C:
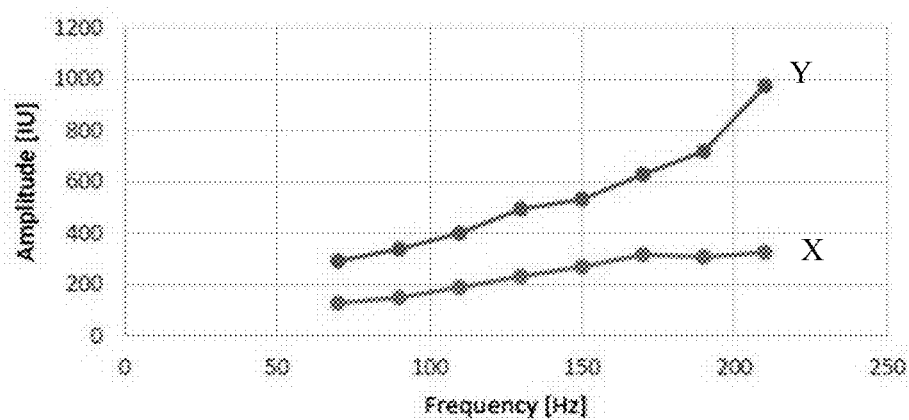
Figure 6D:
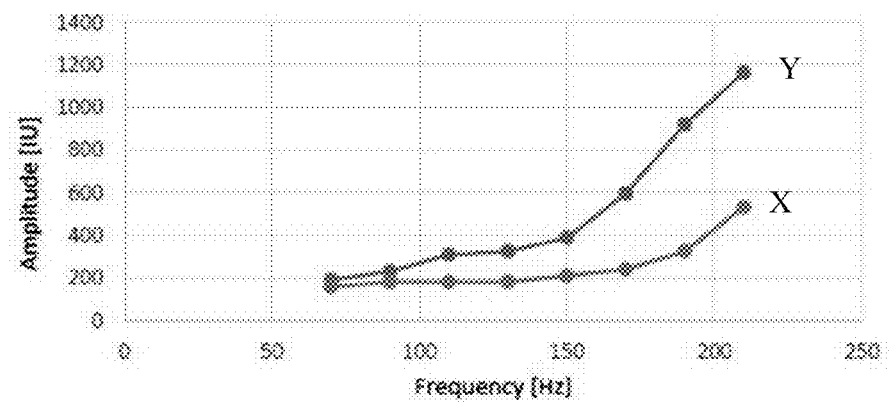
Figure 6E:
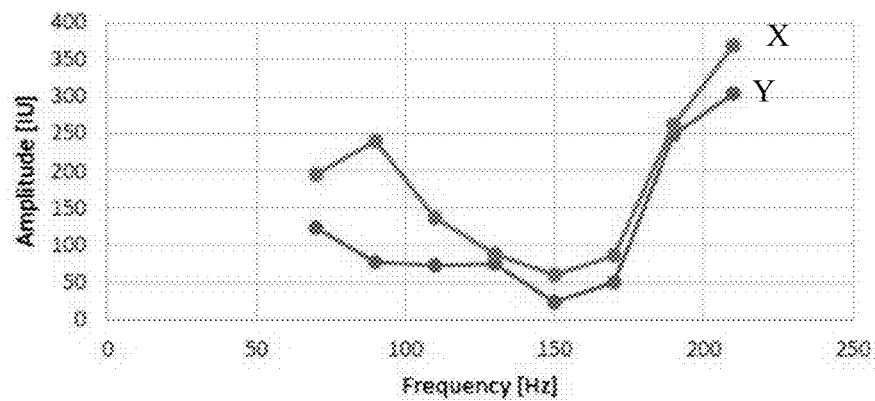
Figure 6F:
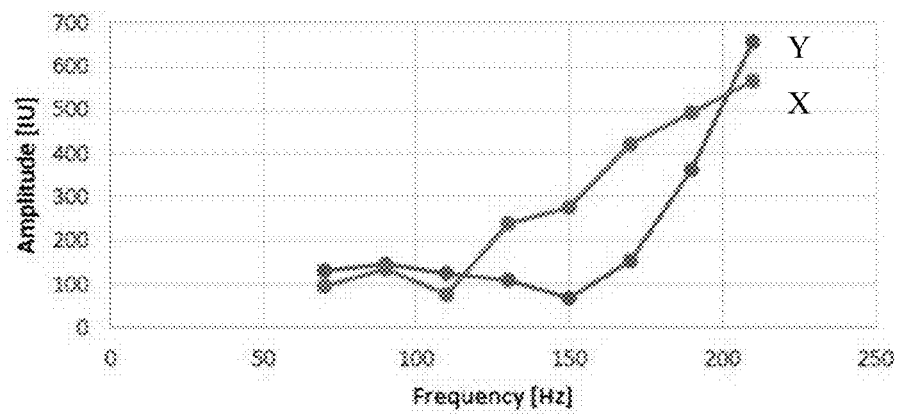

FIGS. 6a-6f represent the temporal frequency signature of a middle and index fingerprints under dry and wet conditions respectively. More specifically, FIGS. 6a-6b represent the temporal frequency signature of an index fingerprint of a person #1 under dry and wet conditions respectively. FIGS. 6c-6d represent the temporal frequency signature of a middle fingerprint of a person #2 under dry and wet conditions respectively. FIGS. 6e-6f represent the temporal frequency signature of an index fingerprint of a person #2 under dry and wet conditions respectively.

TABLE 1

|  | Stability: CV [%] (3 experiments) | Dry-Wet: CV [%] | Sub-fingerprints: CV [%] (4 sub-areas) |
| --- | --- | --- | --- |
| Person #1: Finger #2 | 4.70 | 73.84 | 5.93 |
| Person #2: Finger #3 | 3.54 | 71.15 | 0.79 |
| Person #2: Finger #4 | 6.58 | 71.98 | 1.59 |
| Person #4: Finger #3 | 7.05 | 75.29 | 9.29 |
| Total (180 samples) | 4.72 | 73.76 | 3.45 |

Table 1 shows the statistic parameters for the measured values of the subjects according to the conclusions mentioned above.

The invention claimed is:

1. An authentication method comprising:
    applying a stimulation field of a periodically changing stimulation frequency to an object being under dry and wet conditions;
    applying unfocused imaging to the object being stimulated, said unfocused imaging comprising illuminating the object by at least partially coherent light, collecting a plurality of sequential secondary speckle patterns, each originated from at least a portion of the object being stimulated, and generating image data indicative thereof, said image data comprising a sequence of the speckle patterns for each of the stimulation frequencies; and
    processing the image data, said processing comprising:
    segmenting each of the speckle patterns into a two-dimensional matrix of spatial regions;
    comparing said sequential speckle patterns to determine a spatial- temporal change of a correlation peak for each of said regions;
    determining the change in the correlation peak position in time in the two-dimensional matrix associated with two dimensional spatial locations along the inspected object image;
    determining a temporal frequency signature uniquely characterizing said at least portion of the object by calculating a temporal frequency profile of the two-dimensional correlation peak position per the stimulation frequency, thereby enabling authentication of the object; and
    comparing the temporal frequency signature under the different conditions to provide a real-time scenario invariant identification.

2. The method of claim 1, comprising selecting a coherence length for the coherent illumination to provide a desired ratio between the size of the illumination spot and size of the speckles in the captured set of patterns.

3. The method of claim 1, wherein said object is an individual's finger.

4. The method of claim 1, wherein said object comprises a body's part of at least one individual people.

5. The method of claim 4, comprising applying stimulation to a body's part of a group of people; each region of the two- dimensional matrix being corresponding to the spatial signature authenticating an individual person.

6. The method of claim 1, wherein said periodic stimulation comprises applying sinusoidal pressure stimulation via the support surface contacting the object.

7. The method of claim 1, comprising determining a temporal frequency range of the stimulation field variation.

8. The method of claim 1, wherein said imaging comprises collecting different portions of the plurality of the secondary speckle patterns to reconstruct the full secondary speckle pattern of the object.

9. The method of claim 1, comprising calculating a temporal frequency profile of a plurality of two-dimensional correlation peak positions per the stimulation frequency defining a spatial relationship of temporal frequency signatures for a plurality of two-dimensional spatial regions.

10. The method of claim 1, wherein said object comprises at least one self-excited vibration rigid surface.

11. A system comprising:
    an object support surface configured for vibration in response to a stimulation field of a periodically changing stimulation frequency;
    an imaging device for performing defocused imaging of at least a portion of the object while on said support surface to thereby collect a plurality of sequential speckle patterns originated from at least a portion of said object while on said support being stimulated with the periodically changing stimulation frequency, and generating image data; and
    a processing unit adapted for processing the image data using stimulation field data, said processing unit being configured and operable to segment each speckle pattern into a two-dimensional matrix of spatial regions; compare said sequential speckle patterns to determine a spatial change of the correlation peak for each region of the two-dimensional matrix; determine the change in the correlation peak position in the two-dimensional matrix; and determine a temporal frequency signature uniquely characterizing said at least portion of the object by calculating a temporal frequency profile of a plurality of the two dimensional correlation peak positions per stimulation frequency defining a spatial relationship of temporal frequency signatures for a plurality of two-dimensional spatial regions, said temporal frequency signature being thereby enabled for use in determination of authentication of the object.

12. The system of claim 11, wherein said processing unit controls at least one stimulation field parameter applied to the support surface.

13. The system of claim 11, comprising a source of a beam of at least partially coherent light.

14. The system of claim 11, comprising a beam expander configured for expanding the spot of the beam on the object.

15. The system of claim 11, wherein said imaging device collects different portions of the plurality of the secondary speckle patterns reflected at a surface of the stimulated object.

16. The system of claim 11, wherein said support surface comprises a loud speaker controlled by said processing unit.

17. An authentication method comprising:
applying a stimulation field of a periodically changing stimulation frequency to an object;
applying unfocused imaging to the object being stimulated, said unfocused imaging comprising illuminating the object by at least partially coherent light, collecting a plurality of sequential secondary speckle patterns, each originated from at least a portion of the object being stimulated, and generating image data indicative thereof, said image data comprising a sequence of the speckle patterns for each of the stimulation frequencies; and
processing the image data, said processing comprising:
segmenting each of the speckle patterns into a two-dimensional matrix of spatial regions;
comparing said sequential speckle patterns to determine a spatial-temporal change of a correlation peak for each of said regions;
determining the change in the correlation peak position in time in the two-dimensional matrix associated with two dimensional spatial locations along the inspected object image;
determining a temporal frequency signature uniquely characterizing said at least portion of the object by calculating a temporal frequency profile of a plurality of the two-dimensional correlation peak positions per the stimulation frequency defining a spatial relationship of temporal frequency signatures for a plurality of two-dimensional spatial regions thereby enabling authentication of the object.

18. The method of claim 17, comprising selecting a coherence length for the coherent illumination to provide a desired ratio between the size of the illumination spot and size of the speckles in the captured set of patterns.

19. The method of claim 17, wherein said object is an individual's finger.

20. The method of claim 17, wherein said object comprises a body's part of at least one individual people.

21. The method of claim 20, comprising applying stimulation to a body's part of a group of people; each region of the two-dimensional matrix being corresponding to the spatial signature authenticating an individual person.

22. The method of claim 17, wherein said periodic stimulation comprises applying sinusoidal pressure stimulation via the support surface contacting the object.

23. The method of claim 17, comprising determining a temporal frequency range of the stimulation field variation.

24. The method of claim 17, wherein said imaging comprises collecting different portions of the plurality of the secondary speckle patterns to reconstruct the full secondary speckle pattern of the object.

25. The method of claim 17, comprising applying the stimulation field to an object being under dry and wet conditions and comparing the temporal frequency signature under the different conditions to provide a real-time scenario invariant identification.

26. The method of claim 17, wherein said object comprises at least one self-excited vibration rigid surface.

* * * * *